Patented Aug. 26, 1924.

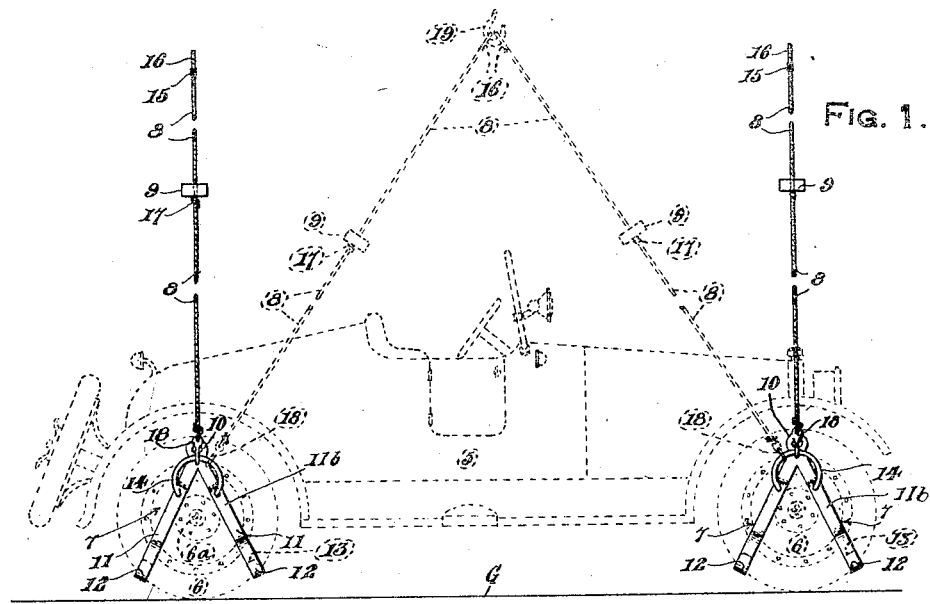
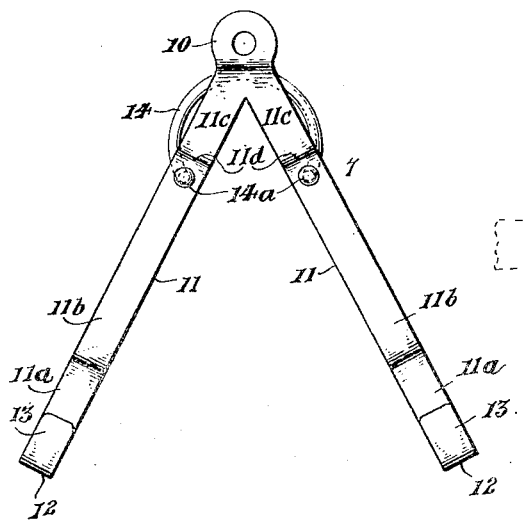
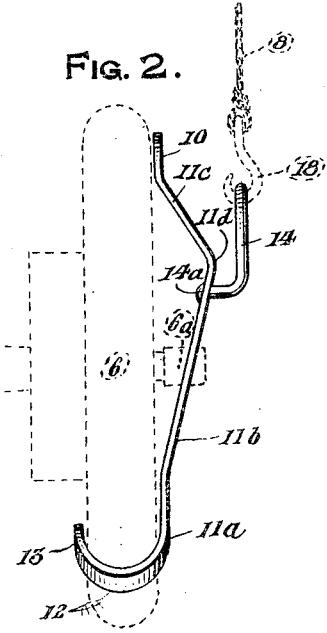

1,506,665

UNITED STATES PATENT OFFICE.

EDWARD PRAY, OF JERSEY CITY, NEW JERSEY.

AUTOMOBILE HOISTING APPARATUS.

Application filed November 22, 1923. Serial No. 676,310.

*To all whom it may concern:*

Be it known that I, EDWARD PRAY, a citizen of the United States of America, residing at Jersey City, in the county of Hudson and State of New Jersey, have invented certain new and useful Improvements in Automobile Hoisting Apparatus, of which the following is a specification.

This invention relates to automobile hoisting apparatus especially adapted for handling completely assembled motor vehicles for placing them aboard ships or flat railway cars.

With the ever increasing desire of the American people to travel in foreign countries, for well known reasons, and with the equally as rapid increase in the number of automobile owners in this country, it is not a very difficult proposition to explain the large volume of business, of transporting individually owned automobiles, now enjoyed by steamship companies. The present methods employed by such companies, for handling automobiles, are not, however, suitable for the volume of business.

For the purpose of permitting automobiles to be handled by ordinary hoisting tackle, most steamship companies require such machines to be boxed or crated. The cost to an automobile owner for packing his car in this manner is generally greater than the actual transportation charge and such packing expense must usually be paid at the beginning of the return trip as well as the trip over. To overcome the necessity of this initial charge, some companies have devised rather crude cradles or platforms to which an automobile may be lashed for enabling it to be handled. Such cradles or platforms are necessarily of very heavy and cumbersome construction and must be either moved under the car while the latter is retained in an elevated position or the car must be run thereupon. It is often impossible, due to limited space, to run the car off of the cradle or platform after it is placed aboard ship. It is, therefore, necessary to dissemble the crate or platform to separate it from the machine or carry both to the other end of the trip. If the latter method is adapted, the transporting company must necessarily own a large number of such outfits. It will be apparent to anyone familiar with the art that such methods are not appropriate for modern business, for, the expenditure of time and money made necessary thereby is too great to be satisfactory to either party concerned.

It is, therefore, the primary object of this invention to provide a hoisting apparatus that will overcome the necessity of crating or boxing assembled automobiles or placing them upon cradles or platforms to permit their being loaded on or unloaded from ships or flat cars.

A further object of the invention is to provide an apparatus of the above mentioned type which may be applied to or removed from an automobile without lifting its wheels off of the ground or without necessitating moving the car in any way.

A further object of the invention is to provide a hoisting apparatus for automobiles which will insure against marring or damaging the latter during handling and which will only engage the wheels of the car.

A still further object of the invention is to provide an apparatus of the above mentioned type which is suitable for handling all sizes and type of automobiles without being altered in any way and one which may be readily and quickly connected to the ordinary hoisting tackles carried by a steamship.

Other objects and advantages of the invention will be apparent during the course of the following description.

In the accompanying drawing forming a part of this specification and in which like numerals are employed designate like parts throughout the same, Figure 1 is a side elevational view of an automobile, shown in dotted lines, with the hoisting apparatus embodying this invention properly associated therewith, Figure 2 is an edge elevational view of the automobile wheel engaging portion of the apparatus shown in operative relation to an automobile wheel illustrated in dotted lines, and Figure 3 is an elevational view of the wheel engaging portion shown in Fig. 2 and taken at right angles thereto.

In the drawing, wherein for the purpose of illustration is shown a preferred embodiment of this invention, the numeral 5 designates the body of an automobile while the numeral 6 is employed for designating the ground engaging wheels associated therewith. The hoisting apparatus consists primarily of four wheel engaging, dual hooks 7, one of which is positioned in engagement with each of the four ground engaging wheels 6, a rope or cable sling 8 for both the front and rear sets of wheels and hooks, and a spreader 9 for each sling.

By inspecting Figs. 2 and 3, it will seen that the dual wheel engaging hooks 7 each consists of a single apertured head 10 having integrally formed therewith divergent angular legs 11 having an arcuate foot 12 at the outer end of each leg, the said curvature of the foot forming an upturned end 13 as shown. By inspecting Fig. 2, it will be seen that the lower section 11$^a$ of each leg 11 is on a plane with the apertured head portion 10 while the intermediate sections 11$^b$ and 11$^c$ converge outwardly to be joined at 11$^d$ at a point closer to the head portion 10 than to the lower section 11$^a$. This construction permits the feet 12 to be placed in engagement with the lower tread portion of the wheel 6 while the apertured head portion 10 may engage the side wall of the upper part of the wheel. By inspecting Fig. 3, it will be seen that the feet 12 are arranged so that they will form segmental parts of a circle. Each dual hook is further provided with an arcuate loop 14 having its ends 14$^a$ suitably secured to the portions 11$^b$ of the divergent legs 11 at points spaced slightly below the apex of the converging sections 11$^b$ and 11$^c$.

The slings 8 are each intended to be formed from a single length of rope or steel cable which is bent or folded at a point substantially midway of its length and seized, as at 15, for forming an eye 16. The opposite sides of each sling are passed through suitable openings formed in one of the spreaders 9 adjacent its opposite ends and are then knotted or otherwise treated to form the enlarged portions 17 below the ends of the spreader 9 for preventing the latter from being separated from the sides of the sling. Each free end of the slings 8 is provided with a hook 18 for permitting the same to be slidably attached to the arcuate loop 14 of a dual hook 7.

By inspecting Fig. 1, it will be seen that the dual hooks 7 may be placed with the feet portions 12 in engagement with the lower portion of the periphery of the wheels 6 while the latter are in engagement with the ground G, thereby, eliminating all necessity of moving the car in any way. The eyes 16 formed in the slings 8 may be positioned in engagement with the hoisting tackle hook 19, as illustrated. The spreaders 9 are preferably about ten feet long for causing the portions of the slings 8, below the spreaders 9, to be spaced laterally from each side of the car 5. The hooks 18, carried by the ends of the slings 8, are connected to the arcuate loops 14, carried by the divergent legs 11, after the dual hooks 7 are positioned in engagement with the wheels 6. The automobile is already to be hoisted after these various elements have been positioned and connected thereto, as described.

It will be noted that the dual hooks 7 are formed of a length substantially equal to the diameter of the wheels 6. It is not necessary that these hooks be of an equal length to the said diameter, but it is necessary that they should be of such a length to position the arcuate loops 14 above the hubs 6$^a$ of the wheels 6. It will be seen that when the slings 8 are connected to the hoisting tackle hook 19, the former diverge downwardly from the said hook and engage the arcuate loops 14 laterally of the vertical axes of the dual hooks 7.

Due to the fact that the said loops 14 are positioned above the hubs 6$^a$, the wheels 6 will be rotated upon their axles, when the automobile is lifted off of the ground, for bringing the vertical axis of each dual hook in longitudinal alinement with the direction of pull of the slings 8. If the arcuate loops 14 were positioned below the hubs 6$^a$, the dual hooks would be pulled laterally toward the longitudinal center of the automobile and would be pulled out of engagement with the wheels 6 when said automobile was elevated.

The apertures in the heads 10 of the dual hooks 7 are provided for receiving the ends of lines not shown which may be employed for steering the automobile while it is being handled in midair by this hoisting apparatus.

It will be very apparent to anyone skilled in the art, that automobiles can be quickly and easily handled by this apparatus without necessitating the expenditure of but a small amount of time. The initial cost of purchasing this apparatus will be so small that a traveler could profitably buy such an outfit, when he intended to take his automobile abroad, and thereby overcome the necessity of having his car boxed or crated, should the steamship company not own a hoisting apparatus of this type.

It is believed from the above detail description, that the construction, operation, and great utility of the apparatus embodying this invention will be apparent and, therefore, further explanation of the same is deemed unnecessary.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:—

1. A hoisting apparatus for automobiles, comprising a double hook adapted to be applied to each wheel and to engage the lower tread portion of the same at points spaced laterally on each side of its vertical axis, an arcuate loop carried by each double hook, separate slings for the front and the rear wheels having hooks slidably removably engaging the arcuate loops on said double hooks, and a spreader for each sling extending transversely of said automobile for preventing the slings from engaging the same.

2. In a hoisting apparatus, the combination with an automobile having ground engaging wheels, of separate slings for the front and back wheels, a dual hook for each wheel having a length substantially equal to the diameter of the wheel adapted to engage the lower tread portion of the same, an arcuate loop carried by each dual hook positioned above the axis of the wheel, hooks carried by said slings adapted to slidably removably engage said loops, and a spreader for each sling having a greater length than the width of the automobile.

3. In a hoisting apparatus for automobiles wherein dual hooks are employed that are adapted to engage the wheels of the same, said hooks each consisting of a head portion, divergent legs formed integrally therewith, a foot portion carried by each leg adapted to engage the tread portion of the wheel, an upturned end formed by each foot portion, and an arcuate loop secured to said legs adjacent said head to which the remaining portion of the hoisting apparatus is removably secured.

4. In a hoisting apparatus for automobiles wherein dual hooks are employed that are adapted to engage the wheels of the same, said hooks each consisting of a head portion, divergent legs formed integrally therewith, said divergent legs each including a lower section positioned on a plane with the head and intermediate sections connecting the head and lower section and converging outwardly of the plane of said head and lower section; a foot portion carried by the lower section of each leg adapted to engage the tread portion of the wheel, an upturned end formed by each foot portion, and an arcuate loop secured to said legs adjacent the points of connection of the converging intermediate sections to which the remaining portion of the hoisting apparatus is removably secured.

In testimony whereof I affix my signature.

EDWARD PRAY.